(12) United States Patent
Greene

(10) Patent No.: US 6,484,433 B1
(45) Date of Patent: Nov. 26, 2002

(54) PORTABLE FISHING ROD HOLDER

(76) Inventor: Patrick Shaun Greene, 8522 Old Brook Dr., Houston, TX (US) 77071

( * ) Notice: Subject to any disclaimer, the term of this patent is extended or adjusted under 35 U.S.C. 154(b) by 22 days.

(21) Appl. No.: 09/595,479

(22) Filed: Jun. 16, 2000

(51) Int. Cl.$^7$ ............................................... A01K 97/10
(52) U.S. Cl. ........................ 43/21.2; 248/514; 248/520; 248/528
(58) Field of Search ............................ 43/21.2; 248/511, 248/514, 517, 518, 519, 520, 528, 529, 538

(56) References Cited

U.S. PATENT DOCUMENTS

| | | | | |
|---|---|---|---|---|
| 440,727 | A | * | 11/1890 | Sheafe |
| 2,869,814 | A | * | 1/1959 | Hurlimann |
| 2,899,155 | A | * | 8/1959 | Rogers |
| 3,546,805 | A | * | 12/1970 | Schaeffer |
| 3,603,019 | A | | 9/1971 | Smeltzer ...................... 43/21.2 |
| 3,846,929 | A | | 11/1974 | McBride ........................ 43/17 |
| 4,014,128 | A | | 3/1977 | Hrdlicka ...................... 43/21.2 |
| 4,017,998 | A | | 4/1977 | Dumler ........................ 43/21.2 |
| 4,106,811 | A | | 8/1978 | Hernandez ................... 43/21.2 |
| 4,133,131 | A | * | 1/1979 | Davy |
| 4,176,819 | A | | 12/1979 | Lowe ........................... 248/513 |
| 4,177,595 | A | | 12/1979 | Chon .......................... 43/21.2 |
| 4,479,322 | A | * | 10/1984 | Koppel ........................ 43/21.2 |
| 4,523,403 | A | * | 6/1985 | Ivy et al. ..................... 43/21.2 |
| 4,676,019 | A | * | 6/1987 | Engles |
| 4,845,881 | A | | 7/1989 | Ward .......................... 43/21.2 |
| 5,131,179 | A | | 7/1992 | McEwen ..................... 43/21.2 |
| 5,152,494 | A | * | 10/1992 | Frunzar |
| 5,203,815 | A | * | 4/1993 | Miller |
| 5,331,761 | A | | 7/1994 | Kuthy ......................... 43/21.2 |
| 5,335,440 | A | | 8/1994 | Williams ..................... 43/21.2 |
| 5,341,589 | A | * | 8/1994 | Gutierrez |
| 5,345,708 | A | * | 9/1994 | Loyd |
| 5,414,953 | A | * | 5/1995 | Taylor |
| 5,647,161 | A | * | 7/1997 | Miller |
| 5,855,087 | A | | 1/1999 | Risinger ...................... 43/21.2 |
| 5,873,192 | A | * | 2/1999 | Chiu ........................... 43/21.2 |
| 5,913,673 | A | * | 6/1999 | Womac ....................... 43/21.2 |
| 6,185,855 | B1 | * | 2/2001 | Sizer et al. ................... 43/21.2 |
| 6,196,513 | B1 | * | 3/2001 | Edwards et al. |

FOREIGN PATENT DOCUMENTS

| | | | | |
|---|---|---|---|---|
| FR | 2539584 | B1 | * | 7/1984 |
| JP | 5-227868 | B1 | * | 9/1993 |
| JP | 7-289136 | B1 | * | 11/1995 |
| JP | 7-327569 | B1 | * | 12/1995 |
| JP | 2000-350544 | B1 | * | 12/2000 |

\* cited by examiner

*Primary Examiner*—Darren W. Ark

(57) ABSTRACT

A fishing device that securely supports a fishing rod with a high degree of stability is described. The device functions to provide greater convenience for the shore fisherman and further provides a choice as to the size and type of ballast device used as an anchor for the fishing device. Additionally, the fishing device provides a means to adjust the inclination of a fishing rod relative to the earth for unattended fishing. The aforementioned benefits are achieved accomplished by providing a portable fishing device encompassing a large preferably circular ring upon which a fishing bait container (or any other weighted ballast member) is placed. Extending symmetrical outwards and on the same plane as the ring is a primary bar, attached to which are two arms: an adjustment arm and a fishing rod holding arm. A secondary bar is attached perpendicularly and symmetrically at the end of the primary bar to provide an even higher degree of lateral stability. When not in use, the fishing device can be folded flat and secured via the provided bolt and nut, providing easy storage and transport.

4 Claims, 2 Drawing Sheets

PORTABLE FISHING ROD HOLDER

BACKGROUND OF THE INVENTION

1. Field of the Invention

The present invention relates generally to fishing devices, and more particularly to a fishing rod holder for supporting a fishing rod at a desired fishing spot. Still more particularly, the present invention relates to a fishing rod holder capable of both securely retaining a fishing rod in location and being collapsible into a compact condition to facilitate storage and ease of transport.

2. Description of the Prior Art

A common problem for fishermen is that after they have baited and cast their line, they frequently have no place secure their fishing rods if they want to leave them unattended. Many have tried wedging their fishing rigs between large rocks which are often present at fishing locations, but this is an insecure method and can result in the loss of the fishing rod if a fish strikes the line hard enough or if the waters get too rough.

Many devices designed to secure fishing rods are available to fishermen but none are particularly convenient. While many of the designs may incorporate a fishing tackle box, this does not provide a high level of stability for the fishing rod to be safely attached thereupon, and are susceptible to tipping when attempting to open the tackle box. Often with systems of this type, the fishing rod obstructs the tackle box in such a way to prevent the operator from opening it while the rid is secured. Some designs, while, providing a fairly stable base from which a fishing rod can be attached are not as convenient to transport. Still others are easy to transport, being easily disassembled and put into a tackle box, but are not very sturdy and pose a risk of tipping over.

The present invention overcomes the deficiencies of the prior art.

BRIEF SUMMARY OF THE INVENTION

It is an object of the invention to provide a fishing device to securely support a fishing rod with a high degree of stability. Another object of the invention is to provide a fishing device which provides greater convenience for the shore fisherman. Furthermore, another object of the invention is to provide the fisherman a choice as to the size and type of ballast device used as an anchor for the fishing device. Finally, it is intended to provide a fishing device which provides adjustable inclination of a fishing rod relative to the earth.

The aforementioned objects can be accomplished by providing a portable fishing device encompassing a large preferably circular ring upon which a fishing bait container (or any other weighted ballast member) is placed, providing a stable anchor for which a fishing rod handle can be attached. For convenience, a bar runs along the bottom of this ring from end to end to allow the ring to be used with a fishing bait container whose outer diameter is slightly less than the inner diameter of the ring. Additionally, extending symmetrically outwards and on the same plane as the ring is a primary bar, attached to which are two arms: an adjustment arm and a fishing rod holding arm. A secondary bar is attached perpendicularly and symmetrically at the end of the primary bar to provide an even higher degree of lateral stability. When not in use, the fishing device can be folded flat and secured via the provided bolt and nut, providing easy storage and transport.

Additional advantages in the design of this invention will become apparent from the following detailed description and drawings.

BRIEF DESCRIPTION OF THE DRAWINGS

For a more detailed description of the preferred embodiment of the present invention, reference will now be made to the accompanying drawings, wherein.

Figure 1:
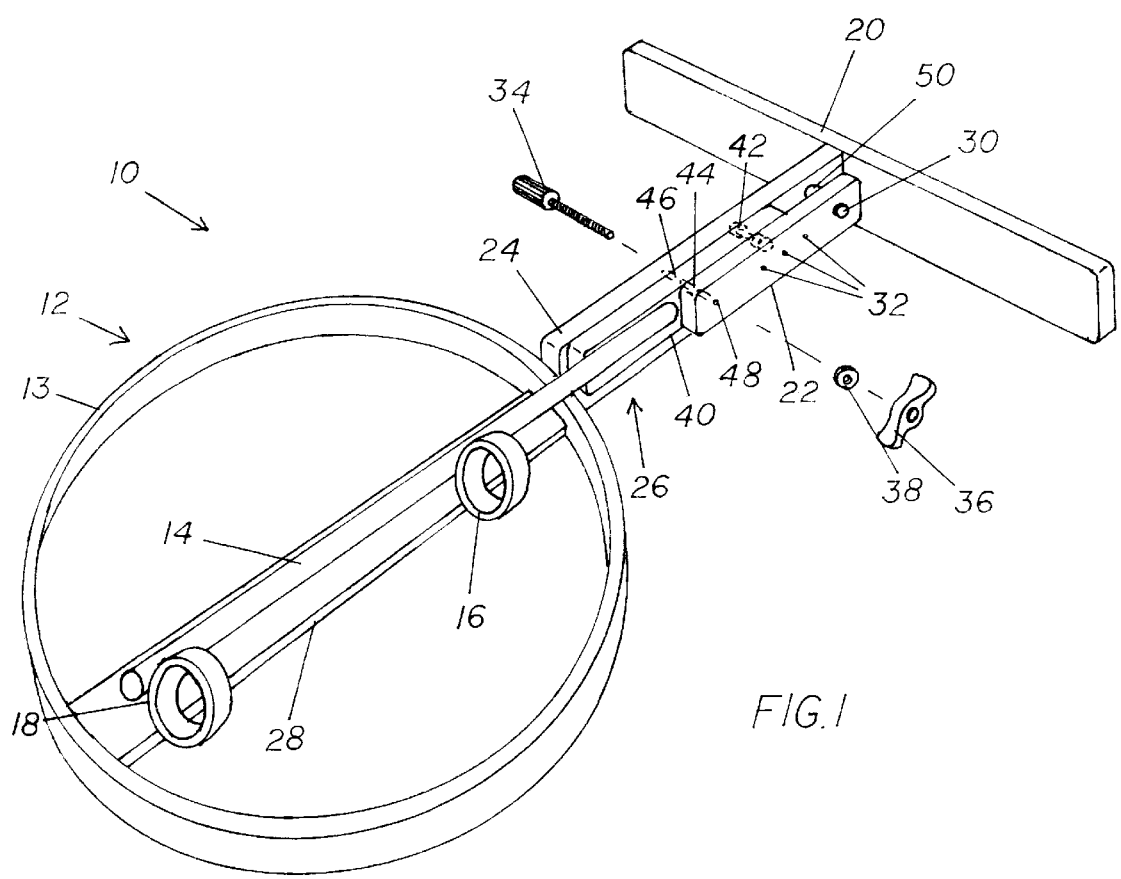
FIG. 1 is a perspective view a preferred embodiment of the present invention detailing a fishing device in the collapsed position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
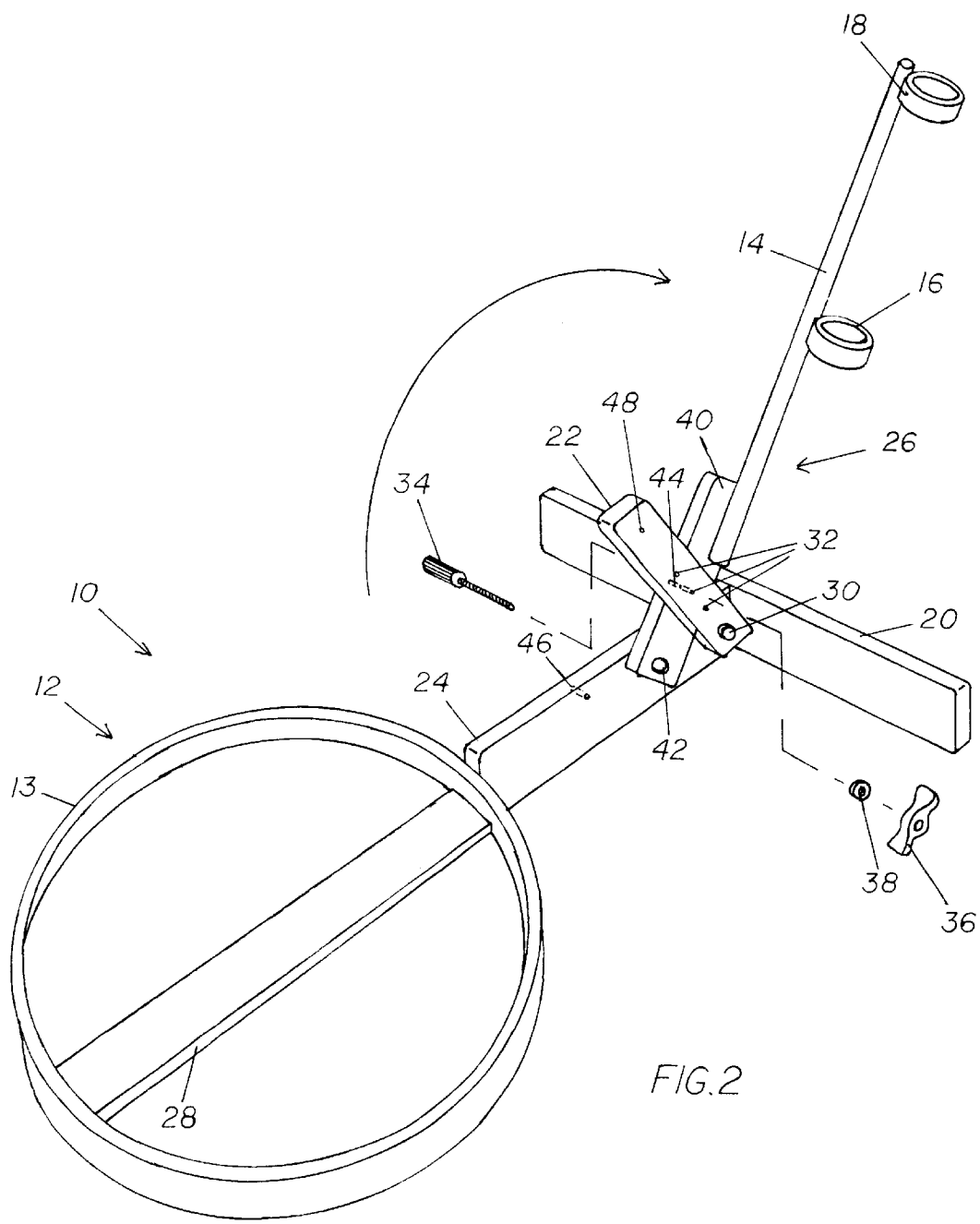
FIG. 2 is a perspective view of the fishing device of FIG. 1 in the operative position.

Referring to FIGS. 1 and 2, a portable fishing device 10 in accordance with a preferred embodiment of the present invention is depicted in the folded position. Fishing device 10 is preferably formed from a rigid, corrosion resistant material, preferably steel or high-strength plastic and includes a ballast anchor 12 and an arm assembly 26. Ballast anchor 12 is preferably in the form of a circular ring 13 that lies perpendicular to the earth when in use. Ballast anchor 12 preferably includes a support bar 28 affixed to and spanning the inside diameter of ring 13.

Arm assembly 26 includes a primary bar 24, a secondary bar 20, an arm extension 14, an adjustment arm 22, and an arm base 40. Preferably, primary bar 24 is permanently attached to and extends outwardly from and in the same plane as ring 13. Secondary bar 20 is permanently attached to the end of primary bar 24 and extends outwards from either side of primary bar 24. Secondary bar 20 is preferably perpendicular to bar 24 and has a length approximately equal to the diameter of ring 13. Primary bar 24 is preferably wider than ring 13, so as to allow arm extension 14 clearance over ring 12.

Arm extension 14 is attached to the end of arm base 40 which is configured to pivot at its end with respect to primary bar 24 at a fastener 42. Fastener 42 preferably allows free pivotal movement of holding arm 26 about fastener 42. Adjustment arm 22 is preferably likewise attached to primary bar 24 at a fastener 30 that allows free rotational movement about its axis. A spacer 50 (shown in FIG. 1) surrounds the portion of fastener 30 that lies between primary bar 24 and the inside wall of adjustment arm 22. Spacer 50 allows clearance between adjustment arm 22 and primary bar 24 for arm base 40. Fasteners 30 or 42 may be in the form of a clevis pins or any acceptable equivalent and spacer 50 is preferably constructed of a wear resistant plastic material.

Fishing rod arm extension 14 includes fishing rod retaining rings 16 and 18 secured thereupon. To hold the fishing rod in place, rings 18 and 16 are attached to rod holding arm extension 14, generally along a common axis and substantially parallel to the axis of arm extension 14. Preferably, ring 18 is attached at the outside end of arm extension 14, along its side, while ring 16 is attached at a designated distance away from ring 18, closer to the base, and generally coaxial to ring 18. Although an adjustable means to secure rings 16 and 18 may be used, it is preferable for them to be permanently affixed to rod 14.

Cross-drilled holes 44, 46, and 48 are located upon various components to allow the apparatus 10 to be secured in position through the use of a fastener 34. Preferably, fastener 34 comprises a threaded stud that is secured through the use of a washer 38 and a wing nut 36, but may be of any appropriate design. Cross-drilled holes 44, 46, and 48 preferably have smooth bores to facilitate engagement of fastener 34 but may be threaded to further assist in retaining the position of the arm assembly 26 of fishing apparatus 10. Cross-drilled hole 46 is located through primary bar 24, offset from its center, while second cross-drilled hole 44 goes through arm attachment base 40 and third cross-drilled hole 48 is located upon an end of adjustment arm 22. When fishing device 10 is desired to be maintained in the folded position (FIG. 1) holes 46, 44, and 48 are aligned with each other and fastener 32 is engaged therethrough and secured with washer 38 and wing nut 36.

Referring now to FIG. 2, the fishing apparatus 10 can be secured into a fishing configuration by removing washer 38 and wing nut 36, thus allowing fastener 34 to be removed from cross-drilled holes 44, 46, and 48. Attachment base 40, with attached arm extension 14, and adjustment arm 22 are then rotated about their respective fasteners, 42 and 30, until the desired angle of inclination of the arm assembly 26 with respect to anchor 12 is achieved. An array 32 of alignment bores is positioned upon adjustment arm 44 to allow the fisherman flexibility in selecting the optimum angle of inclination. To lock fishing device 10 in place, fastener 34 is then engaged through cross-drilled hole 44 and the selected alignment bore from array 32 and is secured with washer 38 and wing nut 36.

Upon arrival of the fisherman at his desired fishing location, the fisherman places the collapsed fishing device 10 (FIG. 1) onto the ground. Washer 38 and wing nut 36 are then removed from fastener 34 and it is removed from cross-drilled holes 48, 44, and 46, respectfully. Rod holding arm 26 is rotated upwards about fastener 42 and secured at the desired position by rotating adjustment arm 22 upwards and aligning cross-drilled hole 44 with one of the array of alignment bores 32. Fastener 34 is then inserted through one end and washer 38 and wing nut 36 attached onto the other end of fastener 34, effectively securing the rod holding arm at a desired inclination. Finally a ballast device, preferably in the form of a round bucket-style fishing bait container, is placed upon support bar 28 and into ring 12 and acts to anchor apparatus 10 while a fishing rod handle is securably inserted into rings 18 and 16. Is should be appreciated that any other form of appropriate ballast may be utilized to secure ring 12 in position upon the shoreline, including, but not limited to rocks, coolers, and vehicles.

Once the fisherman has completed his fishing tasks, he then may remove the fishing rod handle from rings 16 and 18 and lift the fishing bait container. The device 10 may then be returned to it's collapsed position for transport or storage by reversing the steps of the aforementioned process.

Numerous variations and modifications will become apparent to those skilled in the art once the above disclosure is fully appreciated. For example, items that are disclosed to be perpendicular may be positioned at other angles, pivot points and points of attachment can be shifted, and the relative dimensions of various components can be altered. It is intended that the following claims be interpreted to embrace all such variations and modifications.

What is claimed is:

1. A device to support a fishing apparatus in a desired position, comprising:
   a round ballast anchor adapted to receive a round fitted ballast;
   a support bar rigidly affixed to an inner radius of said round ballast anchor;
   an arm assembly rigidly affixed to said round ballast anchor, said arm assembly comprising:
     a primary bar having a first end rigidly affixed to said round ballast anchor and a second end;
     a secondary bar rigidly affixed to, and extending outward and along the same plane as, said primary bar;
     a support arm pivotably attached to said primary bar via a fastener, said support arm including a fishing apparatus support; and
     an adjustment arm pivotably attached to said primary bar and positioned so as to be engagable with said support arm so as to support said support arm in a desired position relative to said primary bar;
   wherein said secondary bar is affixed to said second end of said primary bar and lies in a common plane therewith.

2. The device of claim 1 wherein said support arm can be supported in a plurality of positions with respect to said primary bar.

3. The device of claim 1 wherein said round ballast anchor, said primary bar, said support arm, and said adjustment arm can lie in a common plane when the device is in a folded state.

4. The device of claim 1 wherein said fishing apparatus support comprises a pair of coaxially aligned rings.

* * * * *